United States Patent
Hall

(10) Patent No.: US 6,896,297 B2
(45) Date of Patent: May 24, 2005

(54) GAS SERVICE RISER ASSEMBLY AND DUCTILE PIPE TO PLASTIC PIPE TRANSITION CONNECTION

(75) Inventor: Howard Wayne Hall, Shawnee, OK (US)

(73) Assignee: Central Plastics Company, Shawnee, OK (US)

(*) Notice: Subject to any disclaimer, the term of this patent is extended or adjusted under 35 U.S.C. 154(b) by 0 days.

(21) Appl. No.: 10/634,253

(22) Filed: Aug. 5, 2003

(65) Prior Publication Data

US 2005/0029804 A1 Feb. 10, 2005

(51) Int. Cl.⁷ .............................................. F16L 17/00
(52) U.S. Cl. .............................. 285/123.1; 285/123.6; 285/123.12
(58) Field of Search ........................... 285/123.6, 123.7, 285/123.12, 123.3, 123.1

(56) References Cited

U.S. PATENT DOCUMENTS

| | | | |
|---|---|---|---|
| 4,005,880 A | * | 2/1977 | Anderson et al. ...... 285/123.12 |
| 4,085,950 A | * | 4/1978 | Alewitz ................... 285/123.1 |
| 4,482,170 A | | 11/1984 | Jacobson et al. |
| 4,589,688 A | | 5/1986 | Johnson |
| 4,801,159 A | | 1/1989 | Sehorn |
| 4,997,214 A | | 3/1991 | Reese |
| 5,326,137 A | | 7/1994 | Lorenz et al. |
| 5,367,756 A | | 11/1994 | Huetinek |
| 5,501,331 A | | 3/1996 | Lyall et al. |
| 5,590,914 A | | 1/1997 | Platner et al. |
| 5,934,711 A | | 8/1999 | Gady |
| 5,988,692 A | | 11/1999 | Springer |
| 6,237,963 B1 | | 5/2001 | Hall |

* cited by examiner

*Primary Examiner*—David Bochna
(74) *Attorney, Agent, or Firm*—C. Clark Dougherty, Jr.

(57) ABSTRACT

A gas service riser assembly and ductile pipe to plastic pipe transition connection is provided. The gas service riser assembly comprises an outer ductile pipe, a plastic pipe having open ends disposed within the outer ductile pipe and extending through one end thereof, a hollow rigid stiffener disposed within the interior of a portion of the plastic pipe within the outer ductile pipe, a gasket positioned around the exterior of the plastic pipe adjacent to the stiffener, and a crimp formed in the outer ductile pipe adjacent to the stiffener and the gasket whereby the outer ductile pipe is compressed against the gasket, plastic pipe and the stiffener to form a seal.

24 Claims, 2 Drawing Sheets

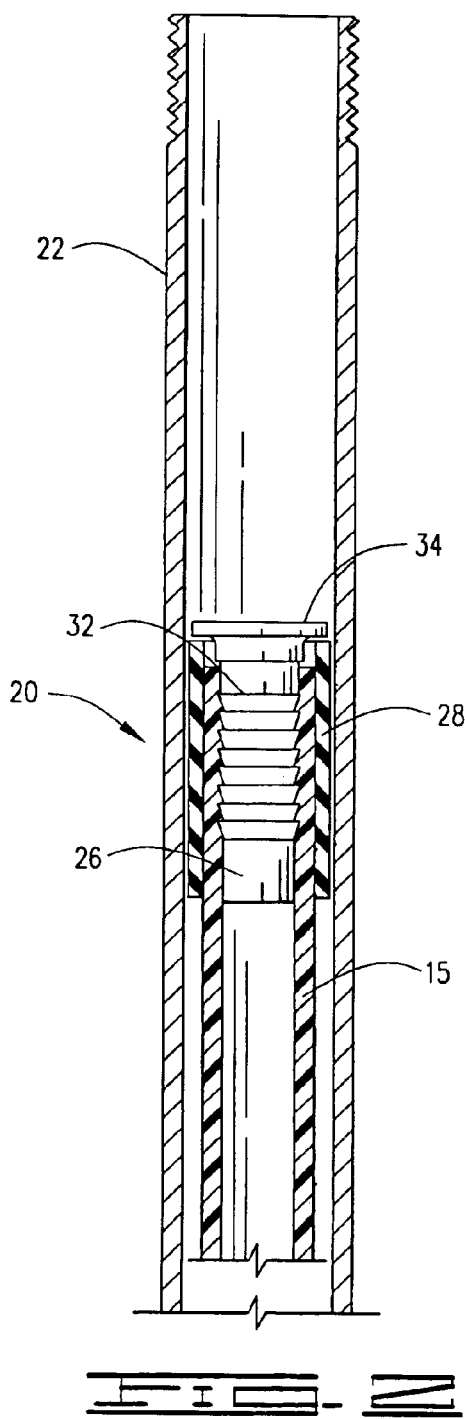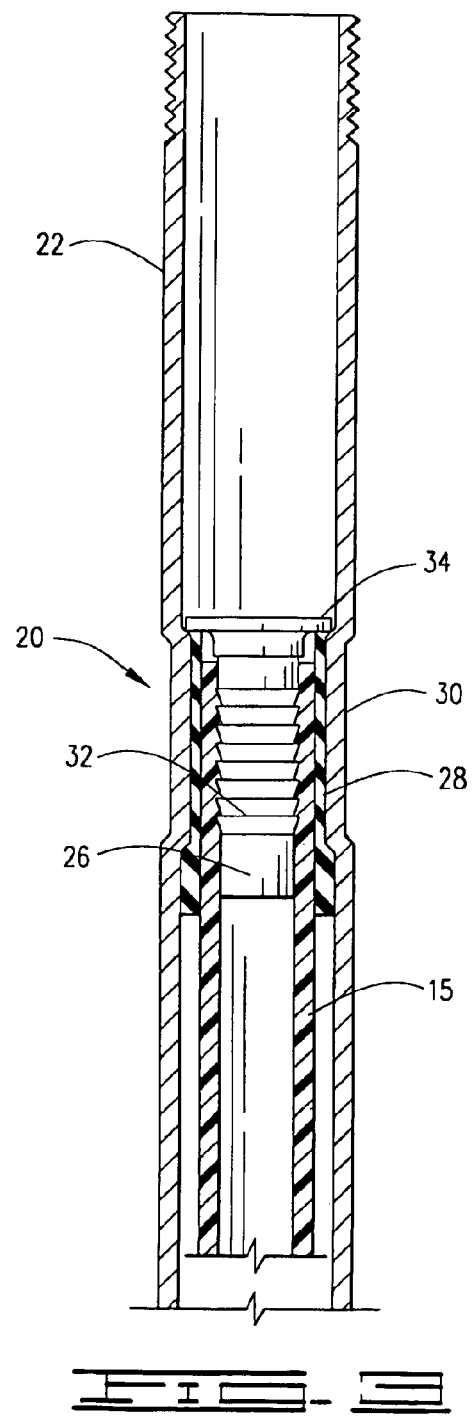

GAS SERVICE RISER ASSEMBLY AND DUCTILE PIPE TO PLASTIC PIPE TRANSITION CONNECTION

BACKGROUND OF THE INVENTION

1. Field of the Invention

The present invention relates to a gas service riser assembly and a ductile pipe to plastic pipe transition connection.

2. Description of the Prior Art

Plastic pipe such as polyethylene pipe is now utilized in most gas distribution systems. As a result, there are many applications where plastic pipe must be connected to metal and other forms of pipe. For example, above ground gas meters are generally connected by metal pipe to below ground plastic gas service pipe. The metal pipe and plastic pipe are often joined together in a gas service riser which extends from below ground to a gas meter above ground. Such riser assemblies have heretofore been comprised of a metal pipe which connects to the gas meter and contains a metal to plastic pipe transition connection therein. That is, the riser assembly comprises an outer metal pipe and an inner plastic pipe. The inner plastic pipe extends through and out of the outer metal pipe and the outer metal pipe provides protection to the inner plastic pipe.

The gas service riser assemblies developed and used heretofore have generally been used successfully, but the seal mechanisms utilized between the inside of the outer metal pipe and the outside of the gas pipe therein have generally been complex and difficult to assemble. Thus, there is a continuing need for improved gas service riser assemblies which are simple, involve the use of only a few parts and are readily assembled. Also, there is a continuing need for a ductile pipe to plastic pipe transition connection which is simple, involves only the use of a few parts and is readily assembled.

SUMMARY OF THE INVENTION

The present invention provides an improved gas service riser assembly and an improved ductile pipe to plastic pipe transition connection which meet the needs described above and overcome the deficiencies of the prior art.

A gas service riser assembly of this invention is basically comprised of an outer ductile pipe, a plastic pipe having open ends disposed within the outer ductile pipe and extending through one end thereof, a hollow rigid stiffener disposed within the interior of a portion of the plastic pipe within the outer ductile pipe, a gasket positioned around the exterior of the plastic pipe adjacent to the stiffener, and a crimp formed in the outer ductile pipe adjacent to the stiffener and the gasket whereby the outer ductile pipe is compressed against the gasket, the plastic pipe and the stiffener to thereby form a seal between the plastic pipe and the ductile outer pipe.

The riser assembly can also include a second gasket positioned around the exterior of the plastic pipe within the end of the outer ductile pipe through which the plastic pipe extends and a second crimp formed in the outer ductile pipe adjacent to the second gasket to thereby form a second seal between the plastic pipe and the ductile outer pipe. The second seal functions to prevent moisture and debris from entering the space between the outer ductile pipe and the plastic pipe.

A ductile pipe to plastic pipe transition connection of this invention comprises an outer ductile pipe, a plastic pipe disposed within the outer ductile pipe, a hollow rigid stiffener disposed within the interior of the plastic pipe, a gasket positioned around the exterior of the plastic pipe adjacent to the stiffener, and a crimp formed in the outer ductile pipe adjacent to the stiffener and the gasket whereby the outer ductile pipe is compressed against the gasket, the plastic pipe and the stiffener to thereby form a seal between the plastic pipe and the ductile pipe.

The objects, features and advantages of the present invention will be readily apparent upon a reading of the description of preferred embodiments which follows when taken in conjunction with the accompanying drawings.

BRIEF DESCRIPTION OF THE DRAWINGS

FIG. 2 is a side cross-sectional view of a portion of the gas service riser assembly containing a ductile pipe to plastic pipe transition connection of this invention prior to when the outer ductile pipe is crimped.

FIG. 3 is a side cross-sectional view of the gas service riser assembly of FIG. 2 after the outer ductile pipe has been crimped.

FIG. 5 is an enlarged side cross-sectional view of a moisture and debris seal formed between the end of the outer ductile pipe and the plastic pipe extending there through.

DESCRIPTION OF PREFERRED EMBODIMENTS

Figure 1:
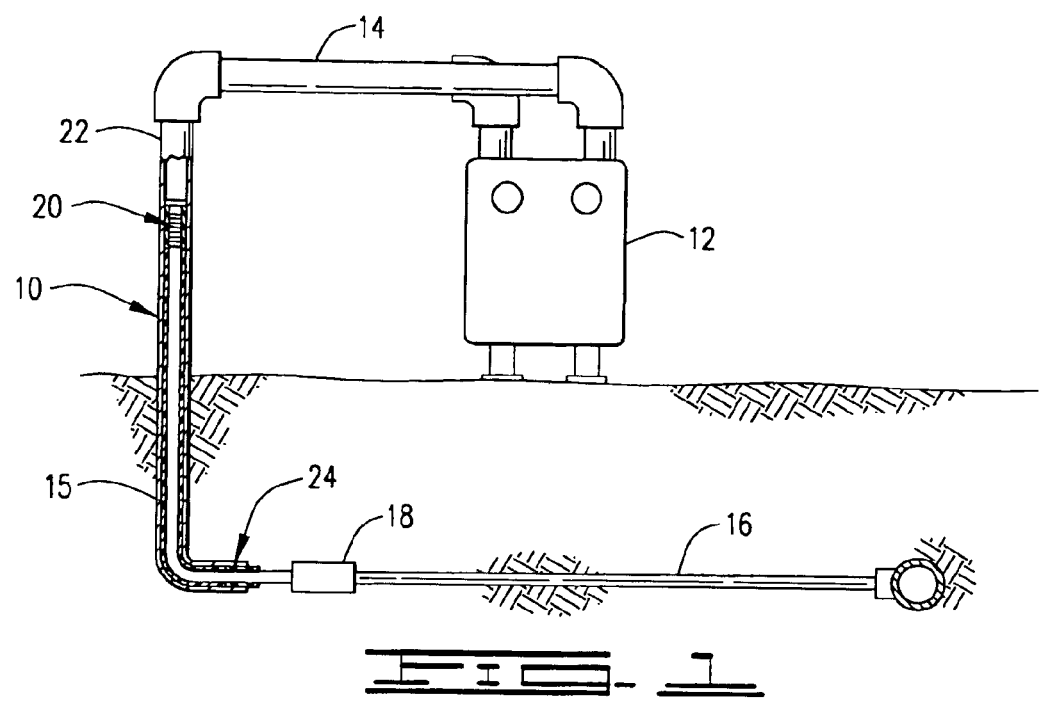
FIG. 1 is a schematic illustration, partially in cross-section, of a gas meter connected to a plastic service pipe by a gas service riser assembly of the present invention.

Referring to the drawings, and particularly FIG. 1, a gas service riser assembly of the present invention is illustrated and designated by the numeral 10. The riser assembly 10 is illustrated connected to a gas meter 12 by a pipe and fitting assembly 14. The plastic pipe 15 of the riser assembly 10 is connected underground to a gas service pipe 16 by a plastic coupling 18. The plastic pipe 15 is a part of the gas service riser assembly of this invention and it extends into an outer ductile pipe 22 which is also a part of the service riser assembly. The outer ductile pipe 22 extends from below ground to above ground and is connected to the pipe and fitting assembly 14. A sealed transition connection 20 is formed between the inside of the outer ductile pipe and the outside of the plastic pipe which will be described further herein below. As mentioned above, the below ground end of the ductile outer pipe 22 can include a seal 24 to prevent moisture and debris from entering the annulus between the outer ductile pipe 22 and the plastic pipe 15.

Referring now to FIGS. 2 and 3, the ductile pipe to plastic pipe transition connection 20 is shown in detail before and after the outer ductile pipe 22 is crimped. The transition connection 20 of the riser assembly 22 comprises the following components. The outer ductile pipe 22, the plastic pipe 15 disposed within the outer ductile pipe 22, a hollow rigid stiffener 26 disposed within the interior of the plastic pipe 15, a gasket 28 positioned around the exterior of the plastic pipe 15 adjacent to the stiffener 26, and a crimp 30 (FIG. 3) formed in the outer ductile pipe 22 adjacent to the stiffener 26 and the gasket 28 whereby the outer ductile pipe 22 is compressed against the gasket 28, the plastic pipe 15 and the stiffener 26 to thereby form a seal between the plastic pipe 15 and the outer ductile pipe 22. The assembly of the transition connection 20 before the outer ductile pipe 22 has been crimped is shown in FIG. 2 and the completed sealed ductile pipe to plastic pipe transition connection 20 after the ductile pipe 22 has been crimped is shown in FIG. 3.

Figure 4:
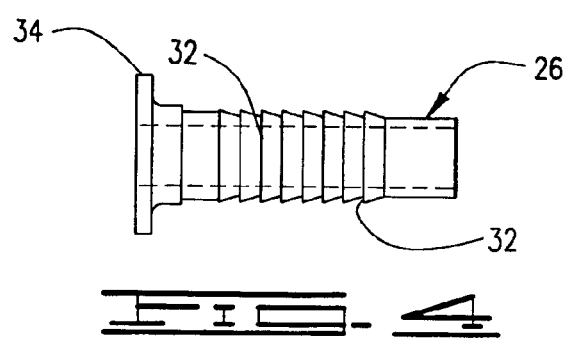
FIG. 4 is a side view of the hollow rigid stiffener utilized in accordance with the present invention.

Referring now to FIGS. 2, 3 and 4, the hollow rigid stiffener 26 is illustrated in detail. As shown, the hollow rigid stiffener 26 includes a plurality of radial serrations 32 having outwardly extending sharp points thereon formed on the outer surface of the stiffener 26. A flange 34 is formed on the end of the stiffener 26 towards which the sharp points of the serrations 32 extend. As shown in FIG. 2, the stiffener 26 is inserted in the end portion of the plastic pipe 15 disposed within the outer pipe 22 with the flange 34 positioned above the end of the plastic pipe 15. The flange 34 extends into close proximity with the inside surfaces of the outer pipe 22.

After the stiffener 26 has been placed in the plastic pipe 15, a gasket 28 is positioned around the exterior of the plastic pipe 15 adjacent to the stiffener 26 inside the plastic pipe 15. As will be understood by those skilled in the art, the stiffener 26 can be inserted in the end of the plastic pipe 15 and the gasket 28 can be glued or otherwise placed on the outside end portion of the plastic pipe 15 adjacent to the stiffener 26 prior to when the plastic pipe 15 is placed within the outer ductile pipe 22 as shown in FIG. 2. Thereafter and as shown in FIG. 3, a crimp 30 is formed in the outer ductile pipe 22 adjacent to the stiffener 26 and gasket 28 whereby a portion of the outer ductile pipe 22 is compressed against the gasket 28, the plastic pipe 15 and the stiffener 26 to thereby form a seal between the plastic pipe 15 and the outer ductile pipe 22. As shown in FIG. 3, the crimp 30 is positioned below the flange 34 of the stiffener 26 which functions to maintain the stiffener 26 and the plastic pipe 15 in the outer ductile pipe 22 and prevents the downward movement of the plastic pipe 15 by contact with the crimp 30 inside the outer ductile pipe 22. The serrations 32 of the stiffener 26 function to retain the stiffener 26 within the interior of the plastic pipe 15.

More specifically, when the outer ductile pipe 22 is crimped, the gasket 28 and the adjacent portion of the plastic pipe 15 are compressed against the stiffener 26. Thus compression causes the adjacent portion of the plastic pipe 15 to cold flow into the grooves between the serrations 32 of the stiffener 26 thereby permanently joining the stiffener 26 to the plastic pipe 15. The crimp 30 formed in the outer ductile pipe 22 reduces the internal diameter of the outer ductile pipe 22 whereby it is smaller than the diameter of the stiffener flange 34 positioned above the crimp 30 as shown in FIG. 3. As a result, the flange 34 is prevented from moving downwardly by the crimp 30 and the transition joint formed between the outer ductile pipe 22 and the plastic pipe 15 forms a gas tight seal that will not fail before the plastic pipe 15 is pulled out of the outer ductile pipe 22.

As will now be understood by those skilled in the art, the transition connection between the outer ductile pipe 22 and the plastic pipe 15 disposed within the outer ductile pipe 22 is comprised of only a few parts and is quickly and easily assembled. As will also be understood, the ductile pipe to plastic pipe transition connection 20 of this invention is not limited to use only in a gas service riser assembly and can be utilized for forming a transition connection between a ductile pipe and a plastic pipe in a variety of other applications.

Figure 5:
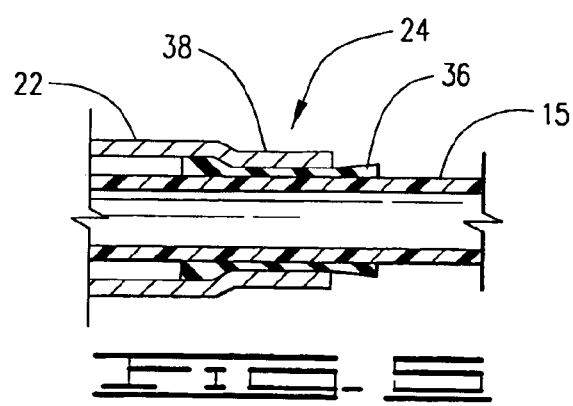

Referring now to FIG. 5, the below ground end of the outer ductile pipe 22 and the plastic pipe 15 are illustrated with a moisture and debris seal 24 formed therebetween. When included, the seal 24 is formed by placing a second gasket 36 around the exterior of the plastic pipe 15 within the end portion of the outer ductile pipe 22. A second crimp 38 is then formed in the outer ductile pipe 22 adjacent to the second gasket 36 to thereby form the second seal 24 between the plastic pipe 15 and the ductile outer pipe 22.

As will be further understood, the outer ductile pipe 22 utilized in accordance with this invention can be formed of any ductile material. A ductile metal pipe is preferred with a steel pipe being the most preferred. The outer ductile pipe can also be formed of ductile tubing, preferably metal tubing and most preferably steel tubing.

The hollow rigid stiffener 26 can also be formed of any rigid material. The stiffener 26 is preferably formed of metal with steel being preferred. While the hollow rigid stiffener 26 illustrated in the drawing and described above includes a flange 34 that extends radially outwardly from the plastic pipe 15 to a position near the outer ductile pipe 22 and adjacent to the crimp 30, it is to be understood that the hollow rigid stiffener 26 can be utilized without a flange and it can be placed within the plastic pipe 15 at any desired position within the outer ductile pipe 22 along with the adjacent gasket 28 and crimp 30. The gasket or gaskets utilized can be formed of any suitable material with rubber being preferred. Finally, as mentioned above, the ductile pipe to plastic pipe transition connection utilized in the gas service riser assembly described above can be used in a variety of other applications where a permanent seal between a ductile pipe and a plastic pipe is required.

A preferred gas service riser assembly of this invention comprises: an outer ductile pipe; a plastic pipe having open ends disposed within the outer ductile pipe and extending through one end thereof; a hollow rigid stiffener disposed within the interior of a portion of the plastic pipe within the outer ductile pipe; a gasket positioned around the exterior of the plastic pipe adjacent to the stiffener; and a crimp formed in the outer ductile pipe adjacent to the stiffener and the gasket whereby the outer ductile pipe is compressed against the gasket, the plastic pipe and the stiffener to thereby form a seal between the plastic pipe and the ductile outer pipe.

Another preferred gas service riser assembly of this invention comprises: an outer ductile metal pipe having open ends with a portion thereof adapted to extend above ground and the other portion thereof adapted to extend below ground; a plastic pipe having open ends, the upper open end being positioned within the above ground portion of the outer pipe with the plastic pipe extending through the below ground portion of the outer pipe and through the open end thereof; a hollow rigid metal stiffener disposed within the upper open end portion of the plastic pipe having a flange that extends radially outwardly from the plastic pipe to a position near the outer pipe; a gasket positioned around the exterior of the plastic pipe adjacent to the stiffener; a cylindrical crimp formed in the outer pipe adjacent to the stiffener and the gasket whereby the outer pipe is compressed against the gasket, the plastic pipe and the stiffener to thereby form a seal between the plastic pipe and the outer pipe; a second gasket positioned around the exterior of the plastic pipe within the below ground open end of the outer pipe; and a second cylindrical crimp formed in the outer pipe adjacent to the second gasket to thereby form a second seal between the plastic pipe and the outer pipe.

A preferred ductile pipe to plastic pipe transition connection of this invention comprises: an outer ductile pipe; a plastic pipe disposed within the outer ductile pipe; a hollow rigid stiffener disposed within the interior of the plastic pipe; a gasket positioned around the exterior of the plastic pipe adjacent to the stiffener; and a crimp formed in the outer ductile pipe adjacent to the stiffener and the gasket whereby the outer ductile pipe is compressed against the gasket, the plastic pipe and the stiffener to thereby form a seal between the plastic pipe and the ductile pipe.

Thus, the present invention is well adapted to carry out the objects and attain the ends and advantages mentioned as well as those which are inherent therein. While numerous changes may suggest themselves to those skilled in the art, such changes are encompassed within the spirit of this invention as defined by the appended claimed is.

What is claimed is:

1. A gas service riser assembly comprising: an outer ductile pipe; a plastic pipe having open ends disposed within the outer ductile pipe and extending through one end thereof; a hollow rigid stiffener including a plurality of radial serrations having outwardly extending sharp points formed along the outside length thereof disposed within the interior of the upper open end portion of the plastic pipe within the outer ductile pipe, the stiffener including a flange at the upper end thereof above and adjacent to the plastic pipe that extends into close proximity with the outer pipe; a gasket positioned around the exterior of the plastic pipe adjacent to the stiffener; and a crimp formed in the outer ductile pipe adjacent to the gasket and the stiffener immediately below the flange of the stiffener whereby the outer ductile pipe is compressed against the gasket, the plastic pipe and the stiffener to thereby form a seal between the plastic pipe and the ductile outer pipe.

2. The riser assembly of claim 1 which further comprises:
   a second gasket positioned around the exterior of the plastic pipe within the end of the outer ductile pipe through which the plastic pipe extends; and
   a second crimp formed in the outer ductile pipe adjacent to the second gasket to thereby form a second seal between the plastic pipe and the ductile outer pipe.

3. The riser assembly of claim 1 wherein the outer ductile pipe is a metal pipe.

4. The riser assembly of claim 1 wherein the outer ductile pipe is a steel pipe.

5. The riser assembly of claim 1 wherein the outer ductile pipe is metal tubing.

6. The riser assembly of claim 1 wherein the outer ductile pipe is steel tubing.

7. The riser assembly of claim 1 wherein the hollow rigid stiffener is formed of metal.

8. The riser assembly of claim 1 wherein the radial serrations having outwardly extending sharp points formed along the outside length of the stiffener extend toward the open end of the plastic pipe within the outer ductile pipe.

9. A gas service riser assembly comprising: an outer ductile metal pipe having open ends with a portion thereof adapted to extend below ground; a plastic pipe having open ends, the upper open end being positioned within the above ground portion of the outer pipe with the plastic pipe extending through the below ground portion of the outer pipe and through the open end thereof; a hollow rigid metal stiffener including a plurality of radial serrations having outwardly extending sharp points formed along the outside length thereof disposed within the interior of the upper open end portion of the plastic pipe within the outer ductile pipe, the stiffener including a flange at the upper end thereof above and adjacent to the plastic pipe that extends radially outwardly from the plastic pipe to a position adjacent to the outer ductile pipe; a gasket positioned around the exterior of the plastic pipe adjacent to the stiffener; a cylindrical crimp formed in the outer pipe adjacent to the gasket and the stiffener immediately below the flange of the stiffener whereby the outer pipe is compressed against the gasket, the plastic pipe and the stiffener to thereby form a seal between the plastic pipe and the outer pipe; a second gasket positioned around the exterior of the plastic pipe within the below ground open end of the outer pipe; and a second cylindrical crimp formed in the outer pipe adjacent to the second gasket to thereby form a second seal between the plastic pipe and the outer pipe.

10. The riser assembly of claim 9 wherein the outer ductile metal pipe is a steel pipe.

11. The riser assembly of claim 9 wherein the outer ductile metal pipe is steel tubing.

12. The riser assembly of claim 9 wherein the hollow rigid metal stiffener is formed of steel.

13. The riser assembly of claim 9 wherein the radial serrations having outwardly extending sharp points formed along the outside length of the stiffener extend toward the open end of the plastic pipe within the outer ductile pipe.

14. The riser assembly of claim 9 wherein the gasket positioned around the exterior of the plastic pipe adjacent to the stiffener is a rubber gasket.

15. The riser assembly of claim 9 wherein the second gasket is a rubber gasket.

16. The riser assembly of claim 9 wherein the open end of the outer pipe above ground is adapted to be connected to a gas meter.

17. The riser assembly of claim 9 wherein the open end of the plastic pipe below ground is adapted to be connected to a source of gas.

18. A ductile pipe to plastic pipe transition connection comprising: an outer ductile pipe; a plastic pipe disposed within the outer ductile pipe; a hollow rigid stiffener including a plurality of radial serrations having outwardly extending sharp points formed along the outer length thereof disposed within the interior of the open end portion of the plastic pipe within the outer ductile pipe, the stiffener including a flange at the end thereof adjacent to the plastic pipe that extends radially outwardly from the plastic pipe to a position adjacent to the outer ductile pipe; a gasket positioned around the exterior of the plastic pipe adjacent to the stiffener; and a crimp formed in the outer ductile pipe adjacent to the gasket and the stiffener next to the flange of the stiffener whereby the outer ductile pipe is compressed against the gasket, the plastic pipe and the stiffener to thereby form a seal between the plastic pipe and the ductile pipe.

19. The transition connection of claim 18 wherein the outer ductile pipe is a metal pipe.

20. The transition connection of claim 18 wherein the outer ductile pipe is a steel pipe.

21. The transition connection of claim 18 wherein the outer ductile pipe is metal tubing.

22. The transition connection of claim 18 wherein the outer ductile pipe is steel tubing.

23. The transition connection of claim 18 wherein the hollow rigid stiffener is formed of metal.

24. The transition connection of claim 18 wherein the radial serrations have outwardly extending sharp points formed along the outside length of the stiffener extend toward the open end of the plastic within the outer ductile pipe.

* * * * *